United States Patent
Ramey

[11] 4,371,593
[45] Feb. 1, 1983

[54] PRESSURE ENERGIZED PORTABLE POWER SOURCE, AND APPARATUS INCORPORATING SAME

[76] Inventor: Carol Ramey, 6536 Vista Del Mar, Playa del Rey, Calif. 90291

[21] Appl. No.: 268,277

[22] Filed: May 29, 1981

[51] Int. Cl.³ ............................................. H01M 2/10
[52] U.S. Cl. ...................................... 429/97; 429/123; 429/162; 174/50; 206/333
[58] Field of Search .................. 429/97, 96, 98, 99, 429/100, 123, 162; 174/50; 206/333

[56] References Cited
U.S. PATENT DOCUMENTS
4,085,253  4/1978  Johnson ................................ 429/98

Primary Examiner—Charles F. LeFevour
Attorney, Agent, or Firm—I. Morley Drucker

[57] ABSTRACT

This invention is directed to a combined battery holder means and pressure-switch plate formed from a unitary piece of electrically non-conductive, thin, flexibly resilient flat sheet material such as, but not limited, to plastic-coated carstock of between, preferably, ½ mil to 5 mils in thickness. Each of the battery holder means and the integrally hinged pressure-switch plate carry aligned electrical contact elements or terminal means, said terminal means normally lying in spaced, non-conductive relationship (i.e., when no pressure is exerted thereon) but as the battery holder means and integrally hinged pressure-switch plate are moved relatively inward towards each other, under external manual pressure, the inherent flexibility of the hinged pressure plate is readily overcome and an electrical interconnection is made between the respective aligned terminal means of the battery holder and the integrally hinged pressure plate. Suitable wiring, or other electrically conductive means, e.g., metallic strips or the like, are provided, interconnecting a portably battery (placed in the battery holder), to the electrical or electromechanical unit to be energized in response to applied manual pressure on the switch plate.

The unitary cardstock material may have additional tab elements integrally formed thereon which when folded along predetermined foldlines form an integral housing, support, or enclosure for an electrically energized motor or vibrator unit, for a light bulb or other electrically operated unit.

15 Claims, 18 Drawing Figures

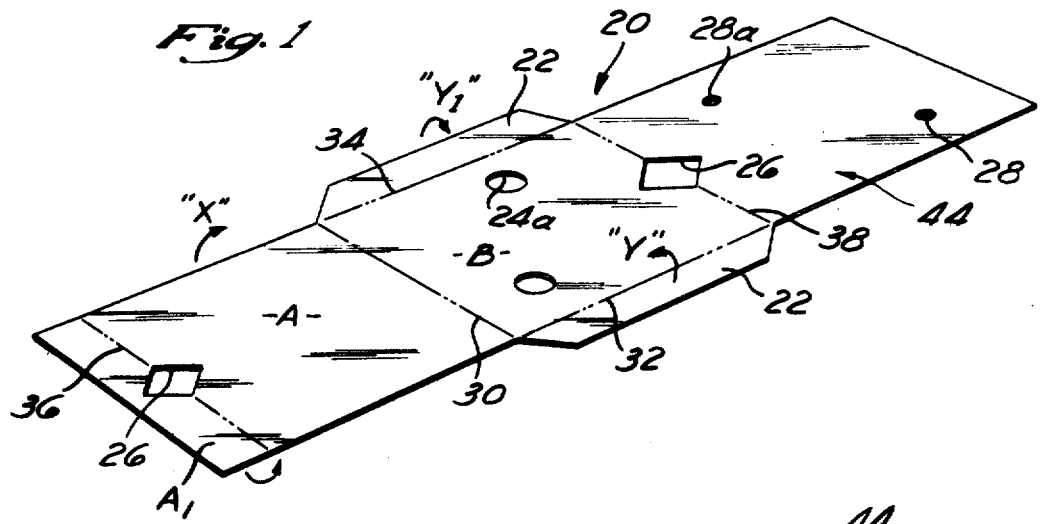
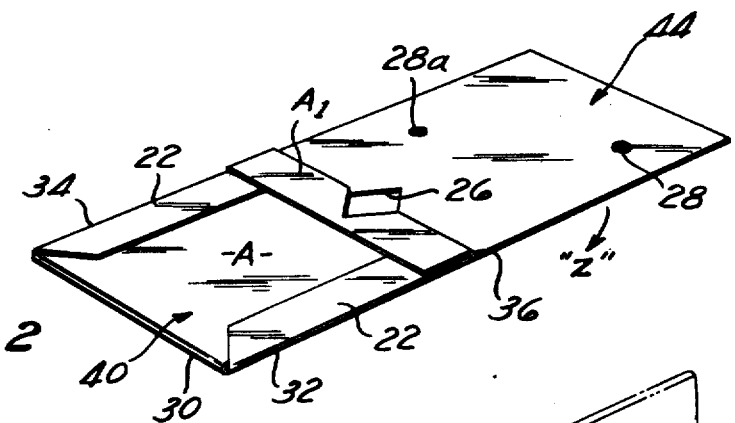
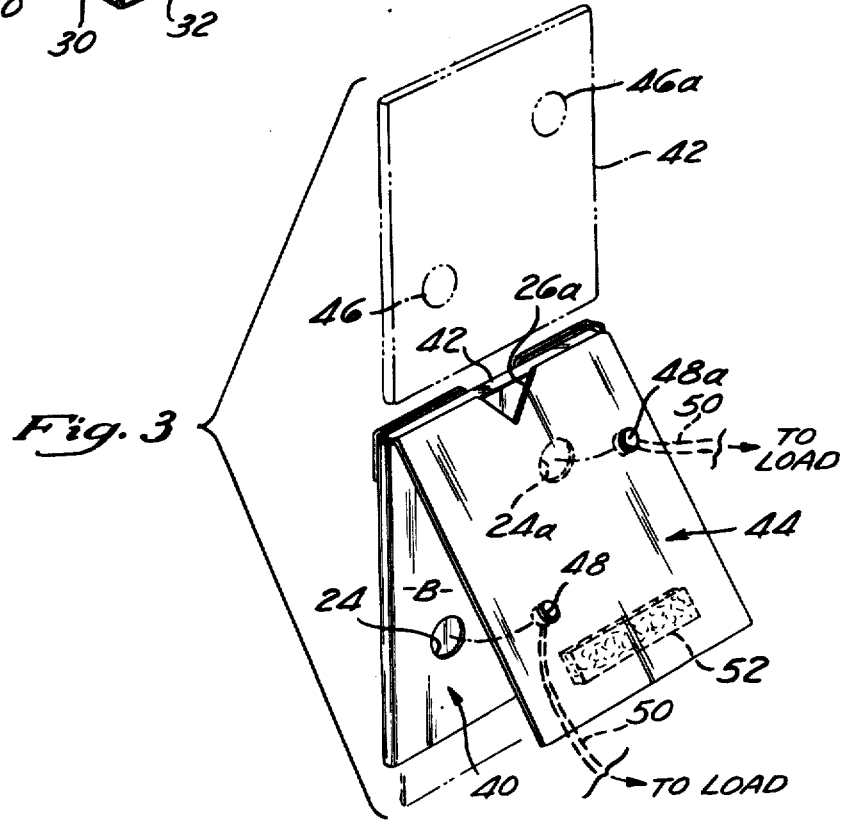

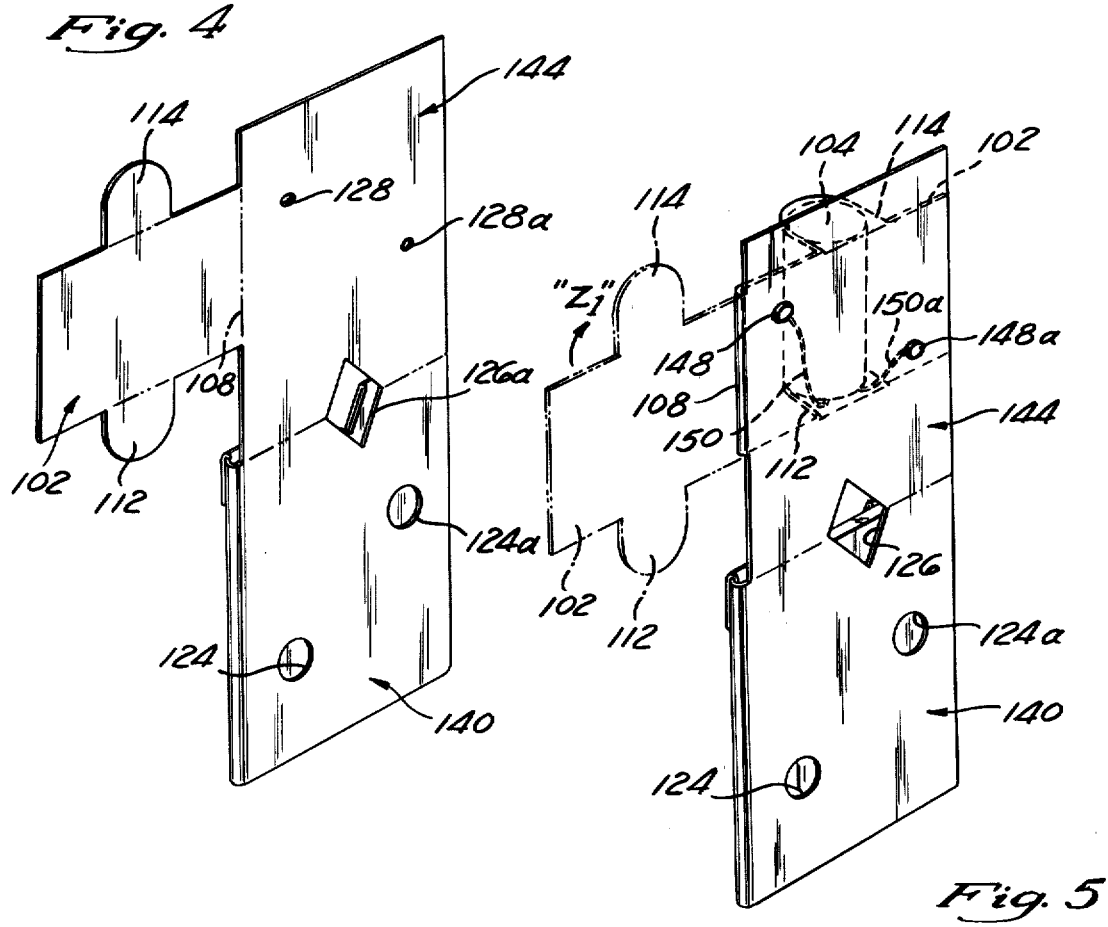
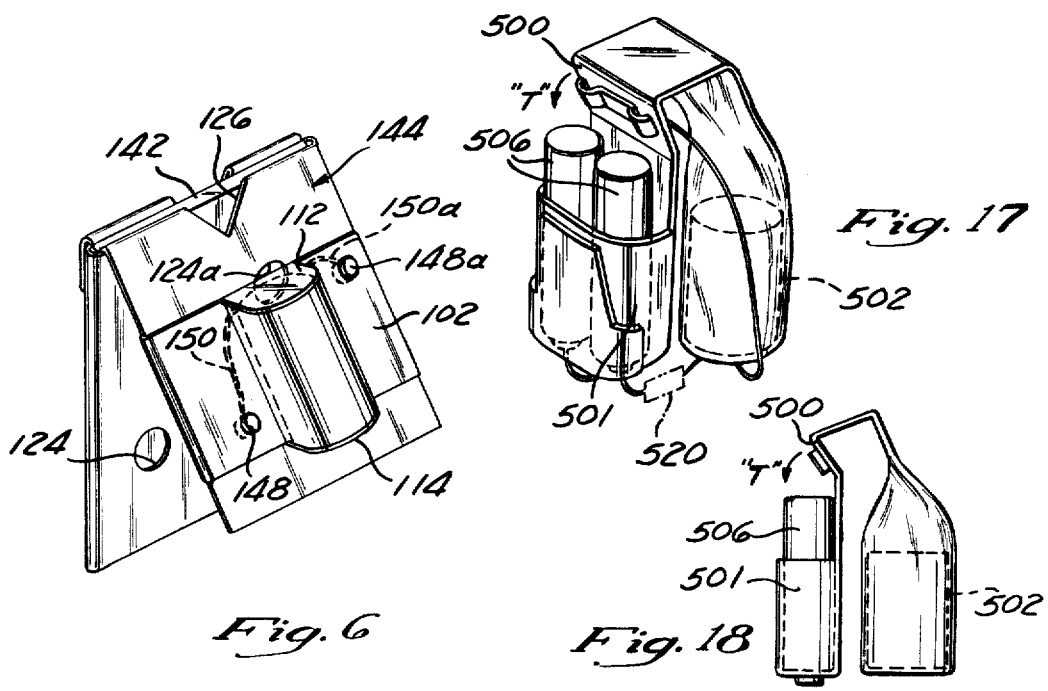

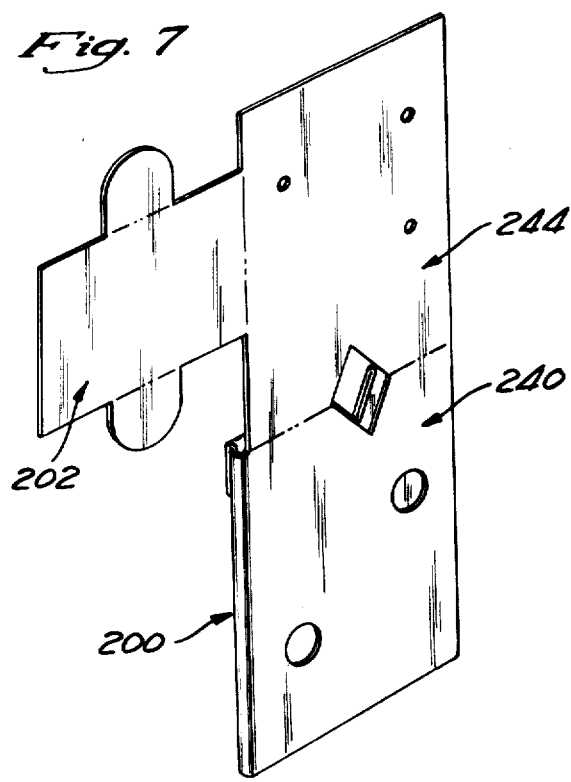
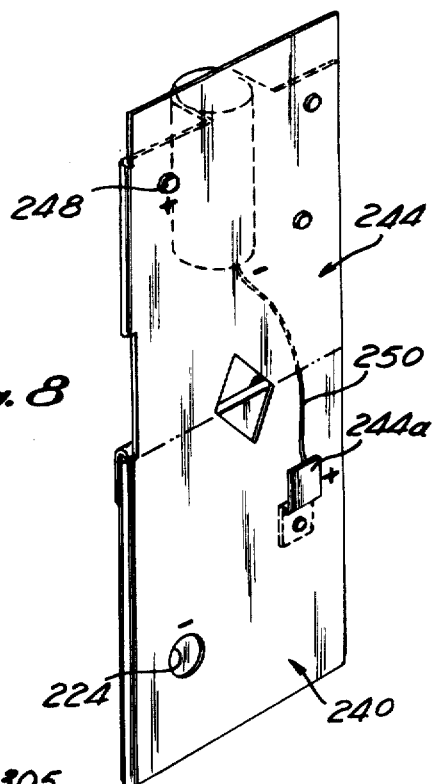
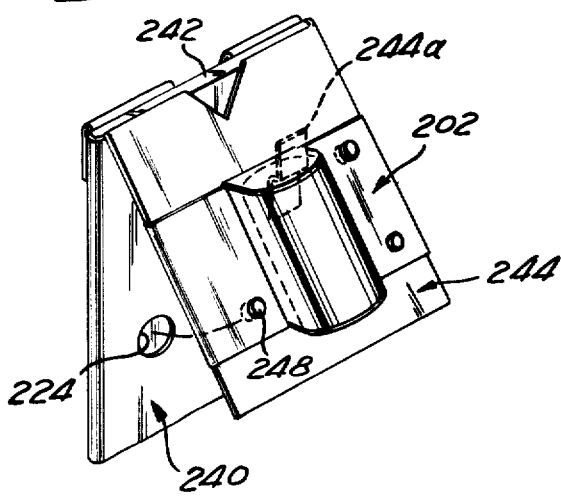
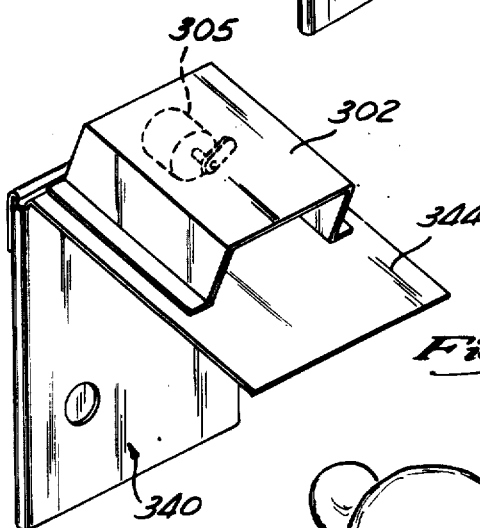
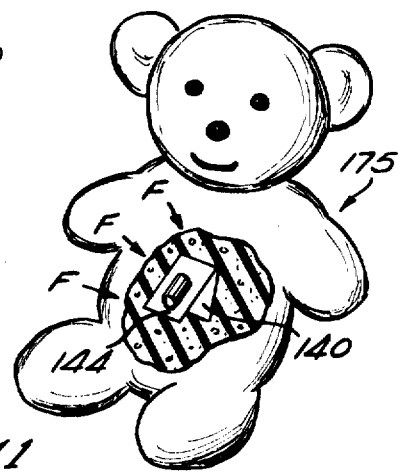

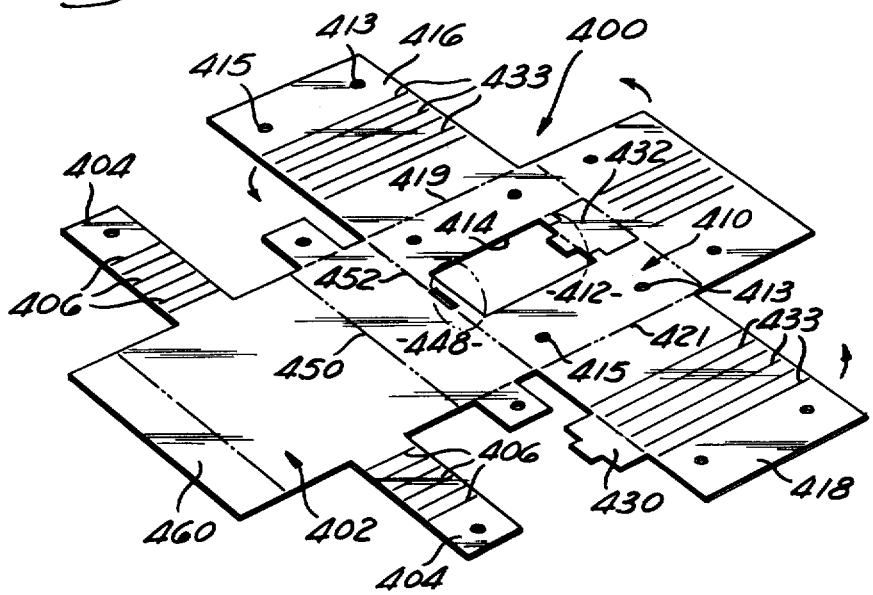
Fig. 12
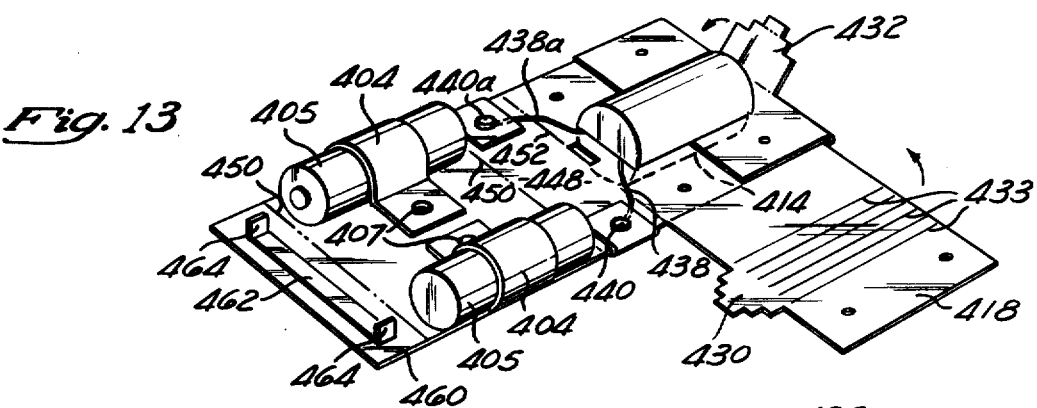
Fig. 13
Fig. 14
Fig. 15
Fig. 16

PRESSURE ENERGIZED PORTABLE POWER SOURCE, AND APPARATUS INCORPORATING SAME

BACKGROUND OF THE INVENTION

1. Field of the Invention

This invention is directed, primarily, towards a method and means of making pressure-sensitive or pressure-energized, portable power sources, e.g. small batteries in the range of from 0.5-6 volts in an improved manner. The invention is directed also, towards the incorporation of such improved pressure-sensitive portable power sources with portable vibratory motors, electric lights, or other small electrical, electronic, or electromechanical units or devices, to thereby provide a variety of types of novel apparatus.

2. Description of the Prior Art

Pressure-sensitive, battery powered electrical equipment is well-known in the art. For example, a particular pressure-switch energized motorized vibrating unit, powered by small, portable batteries, has been patented by this applicant in U.S. Pat. No. 4,278,793 issued Oct. 21, 1980. A pressure-switch energized motorized vibrating unit, enclosed within a cushioned environment, such as a pillow or stuffed toy, has been patented by me in U.S. Pat. No. 4,136,685 issued Jan. 30, 1979, and certain improvements thereof have also been patented by this applicant in U.S. Pat. No. 4,257,408 issued on Mar. 24, 1981.

The pressure-switch energized vibrating units described in these just-referred to prior patents required that the holder for the batteries, vibrating motor unit, and pressure-switch be made in at least three separate injection molded plastic parts, namely a plastic support member, a separate pressure-switch plate, and a separate semi-spherical housing enclosing the motor. The support member carries the portable power source; the pressure-switch plate is pivotally mounted to the support member as by rivets; and the motor is then completely enclosed by the separate, semi-spherical housing. While such a motorized vibratory unit is compact, it is relatively expensive to manufacture since it requires the use of moldable plastic materials and the assembly of at least three plastic components (aside from the use of the usual wiring, the batteries and the vibrator). Furthermore, such a molded unit may, for some applications, as in small toys, be too heavy, cumbersome, and/or occupy too large a volume of space.

The art above-described constitutes the closest prior art of which I am aware.

SUMMARY OF THE INVENTION

My invention is directed primarily to a combined battery holder means and pressure-switch plate formed from a unitary piece of electrically non-conductive, thin, flexibly resilient flat sheet material such as, but not limited to, plastic-coated cardstock of between, preferably, ½ mil to 5 mils in thickness. Such plastic-coated cardstock is widely used for milk cartons.

The unitary cardstock sheet material is initially formed with a first set of foldlines and a first set of tab elements, which foldlines and tab elements, when folded in a predetermined sequence, forms an insulated battery holder means. The unitary cardstock material is also formed with a second foldline means which second foldline means defines a second flexibly resilient tab element. This second tab element, when folded in a predetermined manner, forms an integrally hinged pressure switch plate.

Each of the battery holder means and the integrally hinged pressure-switch plate carry aligned electrical contact elements or terminal means, said terminal means normally lying in spaced, non-conductive relationship (i.e., when no pressure is exerted thereon) but as the battery holder means and integrally hinged pressure-switch plate are moved relatively inward towards each other, under external manual pressure, the inherent flexibility of the hinged pressure plate is readily overcome and an electrical interconnection is made between the respective aligned terminal means of the battery holder and the integrally hinged pressure plate.

Suitable wiring, or other electrically conductive means, e.g., metallic strips or the like, are provided, interconnecting a portable battery (placed in the battery holder), to the electrical or electromechanical unit to be energized in response to applied manual pressure on the switch plate.

The combined battery holder and integrally hinged pressure-sensitive switch means is substantially less expensive to produce and assemble than the injection molded components of the prior art, and also is of substantially lighter weight, and occupies less volume. Furthermore, the combined battery holder and switch means of this invention appears to be as reliable and durable as that of the injection-molded components of the prior art heretofore described.

Other advantages of the use of a unitary piece of initially flat, thin, flexible cardstock material as both the battery holder and integrally hinged switch plate will become clear in the following detailed description. It may be briefly noted, however, at this point that the unitary cardstock material may have additional tab elements integrally formed thereon which when folded along predetermined foldlines form an integral housing, support, or enclosure for an electrically energized motor or vibrator unit, for a light bulb or other electrically operated unit. In this case, the electrically energized unit will be either mounted directly to the integrally hinged pressure plate or mounted adjacent to the battery holder portion of the flexibly resilient cardstock.

The resulting devices or apparatus may be inserted or placed within a cushioning material, e.g., in the form of a stuffed toy, stuffed animal or pillow, as shown and described in any of the applicant's aforementioned patents (especially the U.S. Pat. No. 4,257,408), all of which patents are incorporated herein by this reference. In this cushioned environment manual pressure is exerted indirectly on the integrally hinged pressure plate, by application of pressure on the external surface of the cushioned toy, animal, pillow, etc., in order to energize the particular electrical unit.

The various devices of this invention may also be utilized without any cushioning medium at all. For example, a non-cushioned vibratory unit is suitable for use as part of a novelty greeting card. In this application, the battery source is a very thin, planar, battery of the type made by Polaroid Corporation, Commercial Battery Division, Cambridge, Mass. 02139, and sold under the trademark POLAROID ® POLAPULSE ™ P100. The battery holder is of complementary shape to the battery source.

BRIEF DESCRIPTION OF THE DRAWINGS

FIG. 1 is a perspective view of the initially flat, flexibly resilient, sheet material, indicating foldlines in phantom (but prior to any folding thereof)—for the manufacture of a first embodiment of this invention;

FIG. 2 is a perspective view of this invention showing an intermediate stage thereof, viz. the formation of the battery holder portion but prior to the formation of the integrally hinged pressure plate;

FIG. 3 shows the completed first embodiment of this invention, and shows also a thin, planar battery just prior to its insertion in the battery holder of this invention;

FIG. 4 is a perspective view of a second embodiment of my invention at an intermediate stage of assembly thereof;

FIG. 5 is a perspective view of said second embodiment of my invention showing a more advanced, but not completed, stage of assembly thereof;

FIG. 6 is a perspective view of said second embodiment showing a completed assembly of battery holder, integrally hinged pressure-switch plate, and electrically interconnected motorized unit affixed to said pressure-switch plate;

FIG. 7 is a perspective view of a third embodiment of my invention at an intermediate stage of assembly thereof;

FIG. 8 is a perspective view of said third embodiment of my invention showing a more advanced, but not completed, stage of assembly thereof;

FIG. 9 is a perspective view of said third embodiment showing a completed assembly of battery holder, integrally hinged pressure-switch plate, and electrically interconnected motorized unit affixed to said pressure-switch plate;

FIG. 10 is a perspective view of a fourth embodiment of this invention;

FIG. 11 is a partially fragmentary, perspective view of a stuffed animal into which has been inserted the FIG. 6 embodiment of this invention;

FIG. 12 is a perspective view of the initially flat, flexibly resilient, sheet material, indicating foldlines in phantom (but prior to any folding thereof)—for the manufacture of a fifth embodiment of this invention;

FIG. 13 is a perspective view of said fifth embodiment of my invention at an intermediate stage thereof;

FIG. 14 is a, fragmentary, perspective view of said fifth embodiment of my invention showing the details of the enclosure of a motor by said initally flat cardstock material;

FIG. 15 is a perspective view of said fifth embodiment just prior to the formation of the pressure-switch plate;

FIG. 16 is a side, elevational view of FIG. 15 but showing the pressure-switch plate in its normal, non-operative, position; and FIGS. 17 and 18 are perspective and side elevational views, respectively, of a sixth embodiment of my invention.

DETAILED DESCRIPTION OF THE PREFERRED EMBODIMENT

Referring now to FIG. 1, a first, preferred, embodiment of my invention is there illustrated. The numeral 20 designates generally the sheet or cardstock blank from which the combined battery holder and integrally hinged pressure plate is formed.

The blank 20 is preferably made of thin (e.g., 0.5 mil to 5 mil thickness) cardboard stock preferably coated with a plastic material for the purpose of improving the durability of the sheet material. The sheet material is flexible, resilient, and electrically non-conductive.

The flat blank 20 is generally of elongated, rectangular, shape, is provided with laterally extending tab elements or members 22, circular holes or openings 24, 24a, rectangular cut-outs 26, and a smaller pair of openings or holes 28, 28a for purposes to be described. Blank 20 is also provided with foldlines 30, 32 and 34, 36 and 38. The foldlines and holes or openings in the blank 20 are formed in a conventional manner.

Referring now to FIGS. 2 and 3, as well as FIG. 1, a battery holder 40 is formed from blank 20 by first bending the left-hand portion A of the blank 20, about foldline 30, in the direction of arrow "X," until portion A abuts central portion B, by, secondly, folding tab members 22 over blank portion A, and about foldlines 32 and 34 in the direction of arrows "Y, $Y_1$" by, thirdly, affixing the tab members 22 to blank portion A permanently, as by conventional adhesive or other conventional fastening means, by fourthly, bending the left-handed portion $A_1$ of the blank portion A, counter clockwise about foldline 36, and fifthly affixing end portion $A_1$ to portion A and to a portion of tab members 22 by adhesive or other means. Blank portions A and B thus form the flexibly, resilient side walls or container or holder 40 for a portable power source, namely, a thin planar battery 42 of the type identified by the trademark POLAPULSE TM manufactured by Polaroid Corporation, as previously identified (see FIG. 3 for a showing of the battery 42 in dotted outline).

The right-hand portion of blank 20 (FIG. 1), is then bent downwardly; about foldline 35, in the direction of arrow "Z" (see FIG. 2) to form a flexibly resilient, pressure-sensitive switch plate 44. Switch plate 44 is thus integrally hinged to battery holder 40 about foldline 36. Because the blank 20 is made of stiff, but flexibly resilient cardstock, the switch plate 44 will assume a normal, angular position (with respect to the sidewall B of battery holder 40) when not pressed inwardly towards the battery holder 40, the normal relative, angular position being approximately shown in FIG. 3.

The positive and negative terminals 46, 46a of the thin, planar battery 42, upon full insertion into battery holder 40, will be aligned with openings 24, 24a of battery sidewall B so that the battery terminals 46, 46a may be directly electrically engaged with, or interconnected to, metallic contacts or electrical terminals 48, 48a mounted in openings 28, 28a of pressure-operated switch plate 44. Switch plate 44 may then be externally connected to the unit to be powered, e.g., a motor or other load as shown, schematically, by electrical wires 50 soldered to and leading from contacts 48, 48a to the given load.

As an optional feature, a small block of readily compressible cellular foam 52, or other spring-like element (not shown) may be affixed to either the underside of switch plate 44 or to the sidewall B of battery holder 40. Foam 52 or other spring means acts as a positive spacing means between battery holder 40 and switch plate 44 preventing accidental electrical contact between terminals 48, 48a and the terminals 46, 46a of battery 42.

The cut-outs 26 in blank 20 form a triangularly shaped notch 26a at the entrance to the battery holder 40. A portion of the battery 42 is exposed at notch 26a, and permits easy removal thereof from the battery holder 40.

Referring now to FIGS. 4-6, a second preferred embodiment of my invention is shown in which the blank forming the combined battery holder and pressure-operated switch plate (collectively designated by the numeral 100) is provided with an additional flexibly resilient tab member 102, integrally affixed to and laterally extending from, the switch plate member 144. (The battery holder means 140 and switch plate member 144 of FIGS. 4-6 are formed as described with reference to FIGS. 1-3, as are the triangular entrance notch 126a to facilitate removal of battery 142, the openings 124, 124a in the battery holder 124, and the openings 128, 128a in switch plate 144.) The tab member 102 is formed at the same time that the other tab members of FIGS. 4-6 are formed.

The integral tab member 102 is provided for the purpose of enclosing or housing a motor, a vibratory unit, light bulb, or other electrical unit directly to the side of the switch plate 44 remote from the battery holder 140. A small motor 104 is shown, schematically and in phantom, in FIG. 5 just prior to its enclosure by tab member 102. Tab member 102 is then bent in the direction of arrow "Z₁" (clockwise) about foldline 108, and around motor 104. The tab member 102 is fastened to switch plate 144 by adhesive or other fastener means to permanently enclose the motor 104. The terminals of the motor 104 are electrically interconnected to switch plate terminals 148, 148a, by conventional wiring 150, 150a. The ends of the motor 104 are then enclosed by means of extension tabs 112, 114 depending from tab member 102, the said extension tabs being folded over the exposed ends of motor 104 to thereby fully enclose it. The extension tabs 112, 114 are adhesively attached, or otherwise fastened to the edges of the tab member 102. The motor 104 is thereby fully enclosed within a housing that is formed, at very little additional cost, from a blank of sheet material.

The FIG. 6 embodiment is shown, schematically, positioned within a cushioned environment, such as a stuffed animal 175 in FIG. 11. Application of inwardly directed force F onto the animal 175 will cause relative compression between pressure-switch plate 144 and battery holder 140. Energization of motor 104 will then result as above-described.

Referring now to FIGS. 7-9, a third embodiment is shown. In this third embodiment, a blank is first formed into the battery holder 240, switch plate 244 and housing tab member 202, as shown and described with reference to FIG. 4. The combined battery holder 240, switch plate 244 and housing tab member 202 is designated collectively in FIG. 7 by the numeral 200. In this third embodiment, however, the flexibly resilient switch plate 244 requires only that its one electrical terminal 248 make contact with one corresponding terminal 244 of the power source 242 to complete the circuit, and thereby energize the motor 204. The other electrical terminal 224a in battery holder means 240, (e.g., shown as positive) is permanently and directly electrically interconnected, by an electrical wire 250, to the negative side of the motor 204. In some applications, it may be advantageous to complete the circuit solely by engagement of only one terminal, or contact element (248) of the pressure-sensitive switch plate 244 with one terminal (242) on the power source (242).

Referring now to FIG. 10, a fourth embodiment is shown wherein a separate (non-integral) motor housing 302 is mounted to switch plate 344, the housing is open at one end and the vibratory motor 305, itself, is substantially smaller than the space within the housing. The construction of the battery holder 340, switch plate 344, and electrical interconnections therefor, is otherwise similar to that previously described with reference to any of the previous embodiments. The purpose of the relatively enlarged motor housing is to create an "echo chamber" effect for the motor 304.

It will be noted that in all of the foregoing four embodiments of FIGS. 1-10, a planar battery holder has been utilized in conjunction with a switch plate means that is of approximately the same length and width dimension. The length and width of the entire unit of the embodiments of FIGS. 1-10 are approximately 3×3.7 inches, and with varying thickness, depending upon the voltage. By way of example, the POLAPULSE ™ P100 battery is a 6-volt battery and is approximately 0.14 inches in maximum thickness.

It is anticipated that there will be many applications, for pressure-operated power sources using the basic concepts of this invention, but employing the more conventional forms of cylindrically shaped dry cells of any of sizes AAA through D. FIGS. 12-16 illustrate a fifth embodiment of my invention employing such conventional power sources.

The blank 400, shown in FIG. 12, is made from the same flexibly resilient cardstock material described with reference to FIGS. 1-3. The blank 400 has tab members and foldlines as in the previous embodiments but arranged in somewhat different fashion. Thus, the blank 400 is formed with a battery holder wall portion 402 having tab members 404 extending laterally therefrom, and which can be bent over, along one of the foldlines 40 to adjustably encapsulate, or house, cylindrical dry cell batteries 405. The ends of the tab members 404 are fastened to the battery holder wall portion 402 by means of rivets 407, or other conventional means.

The blank cardstock 400 has integrally affixed, to the battery holder wall portion 402, a housing portion 410 which, as shown, is adapted to securely house a motorized vibratory unit (but of course, could house any other small electrically driven or operated unit, a light bulb, or motor). The housing portion 410 is provided with a central cut-out or slotted portion 412 in which the motor 414 is nested. The left laterally extending tab member 416 is bent under and cradles, the motor 414 (the tab member 416 being bent along line 419), the outer end of the tab 416 being attached, as by rivets 413a, 415a to the right-hand end of central housing portion 412. The respective holes for the rivets 413a, 415a are shown at 413, 415 in FIG. 12, the rivets themselves being shown in FIG. 14. The right laterally extending tab member 418 is bent (counter-clockwise) over motor 414 (about foldline 421) and is attached to the central portion 412 by additional rivets 423, 425 (see FIG. 14). End tabs 430, 432 are provided, extending from tab member 418 and from central portion 412 respectively to enclose the ends of the motorized unit 414. The lateral tab members 416, 418 have multiple foldlines 433 to more readily encircle the tab members 416, 418 about the cylindrical motorized unit 414.

The electrical terminals of the motor 414 are wire-connected, by wires 438, 438a, to terminals 440, 440a, these terminals being affixed to a separately foldable, spine portion 448 of the blank adjacent the motor. The terminals 440, 440a are preferably spaced outside of the perimeter of the motor 414 and the motor, and housing therefore, are bendable, about foldlines 450, 452 defining the spine 448, counter-clockwise, to the position shown in FIG. 15 wherein the motor unit nests 414 between the terminals 440, 440a and the batteries 405.

The switch plate 460, in this embodiment, is integrally formed with the blank 400, and is integrally attached to that end of the battery holder remote from the housing for the motor 414, in contrast to their relative placement in the embodiments of FIGS. 1–10. The switch plate 460 has affixed thereto, by conventional means, a metallic clip 462 formed with a pair of projections or contacts 464. Switch plate 460, when moved in the direction of arrow "R" (FIGS. 15 and 16) will thus complete the circuit and energize the motor 414.

The embodiment of FIGS. 12–16 provides a very compact arrangement of motorized unit, cylindrical dry cell batteries, and pressure-sensitive switch plate.

The embodiment of FIGS. 17 and 18 is similar to the previous embodiments in its use of the same type of blank cardstock to make the battery holder, and housing enclosure for a motor and the like and an integral pressure-sensitive switch plate. However, in this embodiment, the pressure-sensitive switch plate 500 is formed between the battery holder 501 and the motorized unit 502. The batteries 506 are not spaced from each other and the motor 502 is positioned in a back-to-back, generally overlying relationship, with the batteries 506, rather than in a nesting relationship as in the FIGS. 12–16 embodiment. The arrow "T" in FIGS. 17 and 18 denotes the direction of pressure required to complete the electrical circuit. This form of the combined battery holder, pressure-sensitive switch plate, occupies a different volume from any of the preceding embodiments, and will be useful in applications where such volume requirements are specified, and where the direction of compressive forces to complete the circuit are compatible with the particular application.

The type of sound emanating from the vibrating units of this invention may be important in certain toy or game applications. The sound of the vibratory unit may be readily varied from a purring sound to a loud roaring type sound. Thus, by way of example only and referring to FIG. 17 the motor sound can be readily varied from by placing a resistor 520 of a predetermined value in series in the circuit. Also, the effective amperage reaching the electrical subunit to be energized may also be carefully controlled by means of the placement of a resistor, of predetermined value, in the circuit.

I claim:

1. In combination, a battery holder and pressure-sensitive switch plate which comprises:
   a battery holder formed from an initially flat, thin, flexibly resilient, unitary sheet of electrically non-conductive material, provided with a first set of foldline means which when bent along said fold lines in a predetermined manner and affixed in place, forms said battery holder;
   a flexibly resilient tab member, formed from said initially flat, thin, unitary sheet of non-conductive material, and integrally affixed to said battery holder;
   a second foldline means, said tab member when bent about said second foldline means in a predetermined manner, forming an integrally hinged, flexibly resilient, switch plate;
   a third electrical interconnection means provided in said unitary sheet defining said battery holder, said third means permiting electrically interconnection of the positive and negative terminals of a battery adapted to be mounted within said battery holder; and
   electrically conductive terminal means provided on said integrally hinged switch plate, said terminal means being adapted to electrically contact at least one of said positive and negative terminals of the said battery when said switch plate and said battery holder are placed under relative compressive force, the said electrically conductive terminal means on said integrally hinged switch plate being normally spaced from at least one of said positive and negative terminals of said battery.

2. The combination of claim 1 further characterized by:
   said sheet of electrically non-conductive material comprising plastic-coated cardstock having a thickness of between about ½ mil to 5 mils.

3. The combination of claim 1 or 2 further characterized by:
   said third electrical interconnection means comprising through holes in said battery holder whereby to permit electrical interconnection of the positive and negative terminals of a battery adapted to be mounted within said battery holder.

4. The combination of claim 1 or 2 further characterized by:
   said battery holder being of a thin planar shape.

5. The combination of claim 1 or 2 further characterized by:
   compressible spacer means positioned between said switch plate and battery holder.

6. The combination of claim 1 or 2 further characterized by:
   said sheet of electrically non-conductive material forming said battery holder being notched at the entrance end of said battery holder to facilitate removal of a battery placed therein.

7. The combination of claim 1 or 2 further characterized by:
   a second tab member formed from said initially flat, thin, unitary sheet of electrically non-conductive material and integrally affixed to said switch plate, said second tab member being provided with a foldline means which when bent along said foldline means, in a predetermined manner, forms a housing for an electrically energized subunit.

8. The combination of claim 7 further characterized by:
   a motorized vibratory unit contained within said housing, interconnection means for electrically interconnecting said motorized vibratory unit to said switch plate, and a battery.

9. The combination of claim 7 further characterized by:
   a motor contained within said housing, interconnection means for electrically interconnecting said motor to said switch plate, and a battery.

10. The combination of claim 8 further characterized by:
    a housing of internal volume substantially larger than the volume of said motorized vibratory unit.

11. The combination of claim 9 further characterized by:
    a housing of internal volume substantially larger than the volume of said motor.

12. The combination of claim 7 further characterized by:

said second tab member forming said housing being formed with a plurality of foldlines to more readily conform said housing to the shape of said electrical subunit to be contained therewith.

13. The combination of claim 8 further characterized by:
a resistor of predetermined value placed in the circuit to alter the sound of said motorized vibratory unit.

14. The combination of claim 7 characterized by the addition of a pair of cylindrical batteries, held by said battery holder in spaced relationship, said motorized unit nesting between spaced batteries for compactness.

15. The combination of claim 7 further characterized by:
a resistor of predetermined value placed in the circuit.

* * * * *